United States Patent
Schwaerzler

(10) Patent No.: US 6,377,875 B1
(45) Date of Patent: Apr. 23, 2002

(54) METHOD FOR REMOTE-CONTROLLING AN UNMANNED AERIAL VEHICLE

(75) Inventor: Hans-Juergen Schwaerzler, Taufkirchen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/582,815

(22) PCT Filed: Oct. 26, 1999

(86) PCT No.: PCT/DE99/03407

§ 371 Date: Jun. 29, 2000

§ 102(e) Date: Jun. 29, 2000

(87) PCT Pub. No.: WO00/26734

PCT Pub. Date: May 11, 2000

(30) Foreign Application Priority Data

Oct. 29, 1998 (DE) .......... 198 49 857

(51) Int. Cl.[7] .......... G05D 1/00; G06G 7/78
(52) U.S. Cl. .......... 701/2; 244/1 R; 340/853.2; 701/36
(58) Field of Search .......... 701/2, 36; 340/853.2; 244/1 R

(56) References Cited

U.S. PATENT DOCUMENTS

| | | | |
|---|---|---|---|
| 3,724,783 A | * 4/1973 | Nolan, Jr. et al. | 244/3.15 |
| 4,267,562 A | * 5/1981 | Raimondi | 348/144 |
| 5,015,187 A | 5/1991 | Lord | |
| 5,240,207 A | 8/1993 | Eiband et al. | |
| 5,560,568 A | * 10/1996 | Schmittle | 244/48 |
| 5,564,650 A | 10/1996 | Tucker et al. | |
| 5,716,032 A | * 2/1998 | McIngvale | 244/185 |
| 5,890,441 A | * 4/1999 | Swinson et al. | 244/12.3 |
| 6,023,061 A | * 2/2000 | Bodkin | 250/332 |
| 6,176,451 B1 | * 1/2001 | Drymon | 244/3.14 |
| 6,286,410 B1 | * 9/2001 | Leibolt | 89/1.809 |

FOREIGN PATENT DOCUMENTS

| | | |
|---|---|---|
| EP | 0148704 | 7/1985 |
| FR | 2721458 | 12/1995 |
| JP | 09142395 | 6/1997 |

OTHER PUBLICATIONS

"UAV Annual Report FY 1997"; Nov. 6, 1997, p. 5, Defense Airborne Reconnaisance Office.

* cited by examiner

Primary Examiner—William A. Cuchlinski, Jr.
Assistant Examiner—Olga Hernandez
(74) Attorney, Agent, or Firm—W. F. Fasse; W. G. Fasse

(57) ABSTRACT

To avoid an uncontrolled flight of a remotely controlled unmanned air vehicle (UAV), upon loss of radio contact between a control station (6) and the UAV (1), the UAV (1) flies on a preprogrammed safety route (3), as required the UAV is guided to a flight path (2) that is remote-controlled from the control station (6), and, in the event of an interruption of the radio contact, the UAV will fly on a substitute route calculated with on-board equipment, without active intervention from the remote control station.

15 Claims, 1 Drawing Sheet

U.S. Patent
Apr. 23, 2002
US 6,377,875 B1
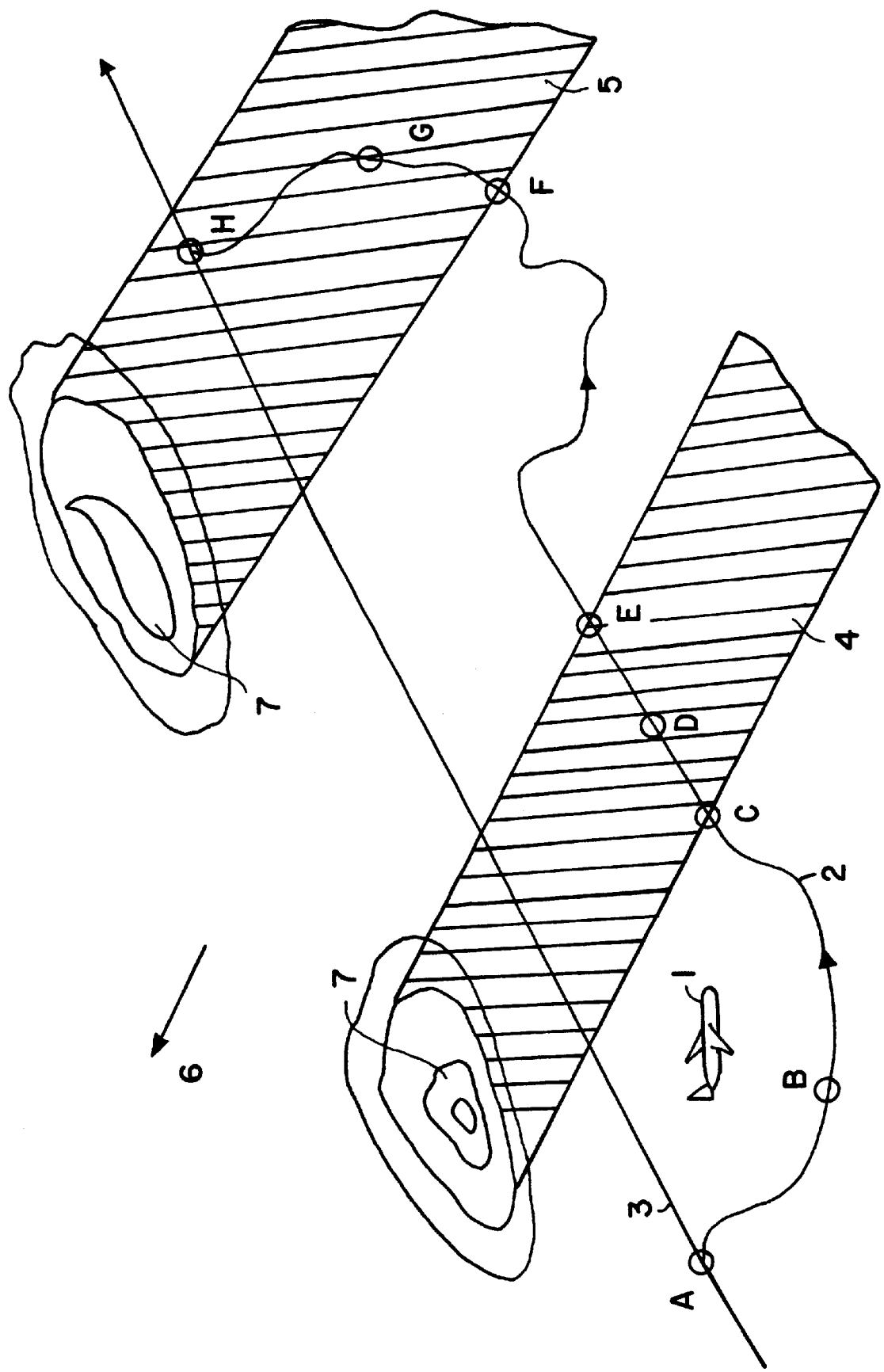

METHOD FOR REMOTE-CONTROLLING AN UNMANNED AERIAL VEHICLE

FIELD OF THE INVENTION

The invention relates to a remote control method for operating an unmanned air vehicle (also called an unmanned airborne vehicle and an unmanned aerial vehicle), and to an unmanned air vehicle for performing the remote control method.

BACKGROUND INFORMATION

Unmanned air vehicle (UAV) missions are essentially based on pre-programmed flight paths. The planning of the flight paths requires precise knowledge of the terrain to be flown over and the expected threat of anti-aircraft defense. Very precise knowledge of the target area is particularly necessary in order to carry out target combat. This often occurs with additional support of final approach sensors that operate by comparing or matching images. These sensors thus require exact images of the targets and, under certain circumstances, images from various perspectives may be required. With preprogrammed flights it is impossible to react to unforeseen events.

The execution of such difficult tasks can be significantly improved if the UAV is remote-control guided via a radio wave transmission link, whereby the "pilot" operates the UAV from a remotely-situated control station. The control station can be located either on the ground or in flight in a manned aircraft. The remote control is carried out with the aid of a television or video image. The image is recorded by a camera in the unmanned UAV and transmitted to the control station where it is presented in a suitable manner (see, e.g., Predator; UAV Annual Report FY 1997, Nov. 6, 1997, page 5).

The above conventional method has the disadvantage that it depends on the reliability of the radio wave link. Loss of radio contact would, as is known, bring the UAV into an uncontrolled flight phase, which eventually results in the UAV crashing.

SUMMARY OF THE INVENTION

It is an object of the invention to avoid the occurrence of an uncontrolled flight of a remotely controlled UAV in the case of loss of radio contact.

The above objects have been achieved according to the invention in a method of remotely controlling an unmanned air vehicle (UAV) from a remote control station by radio transmitting control signals from the control station to the UAV and radio transmitting images from the UAV to the control station. According to the method, the UAV initially flies on a pre-programmed safety route, and then, as required, the UAV is guided by remote control to a flight path by correspondingly radio transmitting appropriate control signals from the control station to the UAV. In the event of an interruption of the radio contact between the control station and the UAV, then the UAV will fly on a substitute route calculated on-board the UAV using on-board equipment of the UAV, without active remote control intervention from the control station.

The invention is based on a method of continuing the flight of the UAV in the case of loss of radio contact by means of a substitute flight program calculated on-board. In this way, the threatened loss of the UAV can be avoided in an advantageous manner: and the mission can possibly be successfully concluded despite the radio interference.

BRIEF DESCRIPTION OF THE DRAWINGS

In order that the invention may be clearly understood, it will now be described in connection with an example embodiment thereof with reference to the accompanying drawing, of which the single Figure is a schematic plan view representing a portion of a flight path of a UAV.

DETAILED DESCRIPTION OF THE INVENTION

An example embodiment of the invention will now be explained in greater detail, based on the drawing. The Figure shows partial views of a scenario of a UAV mission, with the representation of a remotely controlled flight path 2, a pre-programmed safety route 3, and shadow zones 4 and 5 (i.e. areas in which control signals that are radio-transmitted from a control station 6 will be interrupted) resulting from the example terrain formations such as mountains or hills 7, and the position of the control station 6 in the illustrated terrain.

A progression of the method according to the invention is marked with the characteristic points A to H along the remotely-controlled flight path 2. The method steps allocated to the individual points are given below:

A beginning of the remotely-controlled flight path 2 through intervention-in the safety route 3;

B remotely-controlled flight along flight path 2, monitored by continuous extrapolation of the instantaneous flight path;

C entry of the UAV 1 into a shadow zone 4, thus causing the impending beginning of uncontrolled flight, followed by recognition and analysis of the interruption of the remote control;

D continuation of the flight of the UAV along a substitute flight path in accordance with the substitute flight program, generated-on-board the UAV 1;

E transition back to the remote control of the UAV 1 upon leaving the shadow zone 4;

F termination of the remote control of the UAV 1 upon entering another shadow zone 5;

G guidance of the UAV 1 back to the-safety route 3 in accordance with the substitute flight program generated on-board the UAV 1;

H continuation of the flight along the safety route 3.

By way of example, the UAV 1 initially automatically follows a preprogrammed flight course on a safety route 3. The "pilot" in the control station 6 intervenes as necessary in this preprogrammed course. As a result, the UAV deviates from the predetermined course and continues its flight along a remotely-controlled flight path 2 according to transmitted control signals or commands from the control station 6. In this phase, the flight is dependent on the critical reliability of the radio contact. Should the radio contact between the control station 6 and the UAV 1 fail because of shadowing or interference, then the invention provides that the flight, which is threatening to become uncontrolled, is continued with a substitute flight program that is generated on-board, after the interruption has been recognized and its type discerned. The substitute flight program guides the UAV through the danger zone (i.e. the zone of shadowing or interference) until it enters an area in which there is once again radio contact and it is again possible to guide the air vehicle with remote control.

If such an area of re-established radio contact cannot be reached, then an automatic return flight to a predetermined landing strip shall be carried out, after a corresponding flight program has been recalculated on-board.

In a further mode of the method, it is provided that the UAV returns to the preplanned course and approaches an alternatively planned target, there executes the maneuvers desired by the pilot by remote intervention in the program control, and subsequently returns to the landing strip following the preplanned course.

The above described method and operation of the UAV require certain equipment and/or functional processes that are described below.

The UAV 1 is equipped with a per se conventional programmable flight guidance system that allows the UAV to autonomously approach in flight one or more target areas and to return to a predetermined landing strip. According to the invention the automatic flight guidance system is provided with an interface for intervention by the radio remote control. When the guidance commands arrive, this interface in effect makes the program control inoperative and the remote control operative. As a result, the UAV executes the movements commanded by the control station 6.

The automatic flight guidance system has a per se conventional terrain databank, with the help of which the UAV orients itself during automatic flight over the terrain. During remote-controlled flight, an accompanying route planner uses the data in this databank to monitor continuously or in intervals the guidance commands of the control station 6 with respect to maintaining minimum altitudes and minimum distances from obstacles in order to avoid collisions. The route planner does this by extrapolating the instantaneous flight path, based on the guidance commands, and comparing it with the data in the terrain databank.

Recognized dangerous situations are reported immediately to the control station and displayed there, or an anticollision program is calculated on-board and suitable correction maneuvers are automatically executed.

In the case of loss of radio contact, a recognition is provided that differentiates between "loss through shadowing" and "loss through interference". The recognition sensor is the radio receiver itself, which differentiates between "no input signal" and "existing input signal, but unreadable modulation", which are respectively allocated to shadowing and to interference.

If radio contact is lost because of shadowing of the control station, the altitude-dependent shadow zones are calculated by means of on-board equipment, based on the accompanying terrain profile and the coordinate values x/y/z of the control station 6. Using the data calculated on the shadow zone, an optimal flight path in the terrain for flying through the shadow zone is subsequently calculated and supplemented with the calculation of a transition point (e.g. point E) to return to the remote control at the planned point of exit from the shadow zone (e.g. shadow zone 4).

In the case of loss of the radio contact due to receiver "interference", the interference source is located in the terrain (coordinate values x/y) using on-board equipment. The z-coordinate value is determined from the known terrain profile. The altitude-dependent interference zone in the terrain is calculated from the location data. In the case of a known interference zone, an optimal flight path for flying through the interference zone, supplemented by the transition point to return to the remote control at the end of the interference zone, is calculated.

If a transition point to return to the remote control is not found, or if it is no longer of interest to continue the remotely-controlled flight, a route will be calculated with on-board equipment to return the UAV 1 to the safety route 3 and continue the mission to the next planned target area. If no further target area is planned, then the mission is terminated and a route is planned to the preplanned return flight course. Alternatively, a route can be planned to a new return flight course if this is more advantageous than the originally planned course.

Substitute route planning can also be executed during an interference-free remote control phase as a preventive measure, either continuously or in intervals, in order to have a calculated substitute flight program already available when a dangerous situation occurs.

What is claimed is:

1. A remote control method for controlling an unmanned air vehicle (UAV) from a control station by means of radio contact therebetween and radio transmission of images from the unmanned air vehicle to the control station, comprising:

flying the unmanned air vehicle on a preprogrammed safety route (3), as required, guiding the unmanned air vehicle to a flight path (2) that is remotely-controlled through the radio contact from the control station (6), and if the radio contact is interrupted, then flying the unmanned air vehicle on a substitute route calculated with on-board equipment of the unmanned air vehicle, without active intervention from the control station.

2. The remote control method according to claim 1, further comprising:

analyzing the interrupted radio contact based on an input signal received by a radio receiver of the unmanned air vehicle such that a non-existence of the input signal is recognized as shadowing and an existence of the input signal with unreadable modulation thereof is recognized as interference from an interference source, and dependent on and responsive to a result of the analyzing, selecting a suitable calculation routine to calculate the substitute route.

3. The remote control method according to claim 1, comprising calculating the substitute route, while monitoring the following criteria in the calculating:

flight through a critical zone in which the radio contact is interrupted, return to the safety route, and return to a landing strip.

4. The remote control method according to claim 1, further comprising extrapolating an instantaneous flight path of the unmanned air vehicle using on-board equipment of the unmanned air vehicle under the following criteria:

recognition of dangerous situations, safety control of the flight path that is remotely controlled, with respect to ground terrain being flown over, generation and execution of an anticollision program.

5. The remote control method according to claim 1, further comprising calculating an instantaneous flight path of the unmanned air vehicle, calculating expected shadow and interference zones, determining a location of a directly occurring interference source, and transmitting to and presenting at the control station: the instantaneous flight path, the expected shadow and interference zones, and the location of the directly occurring interference source.

6. The remote control method according to claim 1, comprising calculating the substitute route as a preventive measure during the radio contact which is uninterrupted.

7. An unmanned air vehicle comprising:

an on-board preprogrammable flight guidance system for guiding the unmanned air vehicle to fly selectively on a preprogrammed safety route and on a substitute flight route; and on-board equipment for calculating shadow and interference zones as well as the substitute flight routes;

wherein the flight guidance system comprises an interface for intervention by a radio remote control executed from a control station.

8. A method of controlling an unmanned air vehicle, comprising:

transmitting control signals from a remote control station, receiving said control signals in an unmanned air vehicle, and flying said unmanned air vehicle along a remotely controlled flight path responsive to and in accordance with said control signals;

calculating a substitute flight route on-board said unmanned air vehicle;

upon an interruption of said receiving of said control signals, flying said unmanned air vehicle along said substitute flight route.

9. The method according to claim 8, wherein said calculating of said substitute flight route is carried out after and responsive to said interruption of said receiving of said control signals.

10. The method according to claim 8, wherein said calculating of said substitute flight route is carried out during said receiving of said control signals, before said interruption.

11. The method according to claim 8, wherein said substitute flight route guides said unmanned air vehicle to a location for re-establishing said receiving of said control signals, and thereafter further comprising again flying said unmanned air vehicle responsive to and in accordance with said control signals.

12. The method according to claim 8, wherein said substitute flight route guides said unmanned air vehicle to a preprogrammed safety route that has been stored in a flight guidance system on-board said unmanned air vehicle, and then further comprising flying said unmanned air vehicle responsive to and in accordance with said preprogrammed safety route.

13. The method according to claim 8, wherein said substitute flight route guides said unmanned air vehicle to a preprogrammed landing location that has been stored in a flight guidance system on-board said unmanned air vehicle.

14. The method according to claim 8, further comprising evaluating said interruption of said receiving of said control signals, wherein a failure to receive any input signal is interpreted as shadowing of said control signals transmitted from said remote control station and receiving an input signal with an unrecognizable signal content is interpreted as interference of said control signals transmitted from said remote control station.

15. The method according to claim 14, wherein said evaluating determines that said interruption resulted from said shadowing, and then further comprising calculating an expected shadow zone in which said shadowing is expected to prevail based on terrain data including data representing known shadowing formations, and then determining an optimum flight path for flying said unmanned air vehicle through and out of said expected shadow zone.

* * * * *